(12) United States Patent
Trybula

(10) Patent No.: US 10,352,416 B2
(45) Date of Patent: Jul. 16, 2019

(54) UNLOCKING MECHANISM FOR RAM AIR TURBINE ACTUATOR

(71) Applicant: HAMILTON SUNDSTRAND CORPORATION, Windsor Locks, CT (US)

(72) Inventor: Daniel Trybula, Spytkowice (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 406 days.

(21) Appl. No.: 15/196,075

(22) Filed: Jun. 29, 2016

(65) Prior Publication Data

US 2016/0377154 A1 Dec. 29, 2016

(30) Foreign Application Priority Data

Jun. 29, 2015 (EP) .................................. 15461542

(51) Int. Cl.
*F16H 25/18* (2006.01)
*B64D 41/00* (2006.01)
*F16H 35/00* (2006.01)

(52) U.S. Cl.
CPC ........... *F16H 25/18* (2013.01); *B64D 41/007* (2013.01); *F16H 35/00* (2013.01); *F16H 2035/006* (2013.01)

(58) Field of Classification Search
CPC ..................... B64D 41/007; F16H 2035/006
See application file for complete search history.

(56) References Cited

U.S. PATENT DOCUMENTS 4,676,458 A * 6/1987 Cohen .................. B64D 41/007
244/58
4,701,104 A 10/1987 Cohen
(Continued)

FOREIGN PATENT DOCUMENTS

CA 3007899 A1 * 6/2017 ........... B64D 41/007
EP 2985472 A2 * 2/2016 .............. F15B 15/14
(Continued)

OTHER PUBLICATIONS

Extended European Search Report, or the partial European Search Report/Declaration of no search and the European search opinion of the European Patent Office for International Application No. 15461542.1, dated Dec. 23, 2015, 4 pages.

*Primary Examiner* — Christopher P Ellis
(74) *Attorney, Agent, or Firm* — Cantor Colburn LLP

(57) ABSTRACT

An apparatus for unlocking an actuator comprises a first member mounted in a housing for rotation about an axis and having a circumferentially extending surface, a recess being formed in a section of the circumferentially extending surface. A second member for operative connection to a lock release element of an actuator is mounted for movement in a direction generally transverse to the axis of rotation of the first member and has a follower element resiliently biased into contact with the circumferentially extending surface of the first member. A rotary actuator is provided for rotating the first member about the axis between a first, locking position in which the follower element engages on the circumferentially extending surface and a second, unlocking position in which the follower element is at least partially received within the recess.

17 Claims, 7 Drawing Sheets

(56) References Cited

U.S. PATENT DOCUMENTS

| | | | | |
|---|---|---|---|---|
| 4,742,976 A * | 5/1988 | Cohen | B64D 41/007 | 244/58 |
| 5,123,614 A * | 6/1992 | Whitehouse | B64D 41/007 | 244/102 SL |
| 5,398,780 A * | 3/1995 | Althof | B64D 41/007 | 185/39 |
| 5,820,074 A * | 10/1998 | Trommer | B64D 41/007 | 244/58 |
| 8,123,161 B1 * | 2/2012 | Collins | B64C 25/26 | 244/102 R |
| 2013/0078026 A1 * | 3/2013 | Sasscer | B64D 41/007 | 403/81 |
| 2013/0327207 A1 | 12/2013 | Sasscer et al. | | |
| 2013/0327885 A1 * | 12/2013 | Sasscer | B64D 41/007 | 244/54 |
| 2013/0330121 A1 * | 12/2013 | Sasscer | B64D 41/007 | 403/322.4 |
| 2015/0232195 A1 * | 8/2015 | Bannon | B64D 41/007 | 92/15 |
| 2017/0203853 A1 * | 7/2017 | Sobolak | B64D 41/007 | |
| 2017/0241453 A1 * | 8/2017 | Bannon | B64D 41/007 | |
| 2017/0261017 A1 * | 9/2017 | Bortoli | B64D 41/007 | |
| 2017/0298964 A1 * | 10/2017 | Bannon | F15B 15/1457 | |
| 2018/0050813 A1 * | 2/2018 | Larson, Jr. | F01D 25/28 | |
| 2018/0050814 A1 * | 2/2018 | Pawalec | F03D 9/32 | |
| 2018/0129242 A1 * | 5/2018 | Konicek | G05G 5/06 | |

FOREIGN PATENT DOCUMENTS

| | | | | |
|---|---|---|---|---|
| EP | 3176094 A1 * | 6/2017 | | B64D 41/007 |
| EP | 3305664 A1 * | 4/2018 | | F16H 21/06 |
| WO | 8702642 A1 | 5/1987 | | |

* cited by examiner

UNLOCKING MECHANISM FOR RAM AIR TURBINE ACTUATOR

CROSS REFERENCE TO RELATED APPLICATIONS

This application is a Counterpart Application of European Patent Application No. 15461542.1 filed on Jun. 29, 2015, the contents of which are incorporated herein by reference in their entirety.

TECHNICAL FIELD

This disclosure relates to unlocking mechanisms and in particular to an unlocking mechanism for a ram air turbine (RAT) actuator.

BACKGROUND

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power. The RAT is typically pivoted into position by means of an actuator, for example a hydraulic actuator. The actuator typically includes a piston which extends to deploy the RAT. The actuator has a lock mechanism which prevents inadvertent movement of the piston and thus inadvertent deployment of the RAT. The locking mechanism typically comprises a spring loaded lock piston which must be moved in an axial direction to unlock the actuator. Such a mechanism is disclosed for example in US 2013/0327207 A1.

An unlocking mechanism is provided to permit this movement. Typically, the unlocking mechanism comprises a two link, knee type linkage one end of which is rotatably coupled to one end of the locking piston and the other end of which is axially fixed and rotatably coupled to a support. A linear solenoid moves the linkage between a locked and an unlocked position. However, in moving between the two positions, the linkage must go "over centre" and initially displace the lock piston against the force of the lock piston spring, which means that a relatively large solenoid may be necessary.

As weight is of concern in aircraft, it would be desirable to provide a locking mechanism which may potentially be lighter

SUMMARY

Disclosed herein is an apparatus for unlocking an actuator. The apparatus includes a first member mounted in a housing for rotation about an axis (A) and having a circumferentially extending surface, a recess being formed in a section of the circumferentially extending surface and a second member for operative connection to a lock release element of an actuator for movement in a direction generally transverse to the axis of rotation of the first member and having a follower element resiliently biased into contact with the circumferentially extending surface of the first member. The apparatus also includes a rotary actuator for rotating the first member about the axis between a first, locking position in which the follower element engages on the circumferentially extending surface and a second, unlocking position in which the follower element is at least partially received within the recess.

Thus in contrast to the arrangement described above, an unlocking movement of a lock release element, for example a locking piston can be achieved by rotating a first member such that a portion of a second member drops at least partially into a recess formed in a surface of the first member. This avoids the displacement of the locking piston against the biasing force of its spring, allowing, potentially a smaller and therefore lighter actuator to be used.

The first member may be generally cylindrical in shape having a generally circular cross section.

The first member may be spring biased into its first position by one or more springs, for example by torsion springs arranged around the axis of rotation of the first member.

The apparatus may further comprise one or more stops to limit the movement of the first member between its first and second positions.

The first member may comprises an arcuate slot on one or more end surfaces for engagement with a respective stop pin mounted in the housing.

The rotary actuator may be a rotary solenoid.

In some embodiments, a pair of rotary actuators are arranged at opposed ends of the first member.

The rotary actuator, for example a rotary solenoid, may comprise a handle for manipulation by a user.

The first locking member and the rotary actuator may be mounted to one or more mounting rings received within respective bores of the housing.

The follower element of the second member may be a roller.

The disclosure also extends to an actuator comprising an unlocking apparatus as described above.

The actuator may comprising a locking rod axially movable between a locking and an unlocking position, and the second member of the locking apparatus may be coupled to an end of the locking rod such that movement of the follower element of the second member into the recess of the first member allows the locking rod to move to its unlocking position.

The actuator may further comprise a spring for biasing the locking rod towards the first member, that spring providing the biasing for the second member.

The actuator may be a RAT actuator.

Also disclosed is a method of unlocking an actuator comprising rotating a first member having a circumferentially extending surface about an axis from a first position in which a follower element of a second member coupled to the actuator and biased into engagement with the first member engages the circumferentially extending surface of the first member and a second position in which the follower element is at least partially received within a recess in the surface.

BRIEF DESCRIPTION OF THE DRAWINGS

A non-limiting embodiment of this disclosure will now be described by way of example only with reference to the accompanying drawings in which.

DETAILED DESCRIPTION

Figure 1:
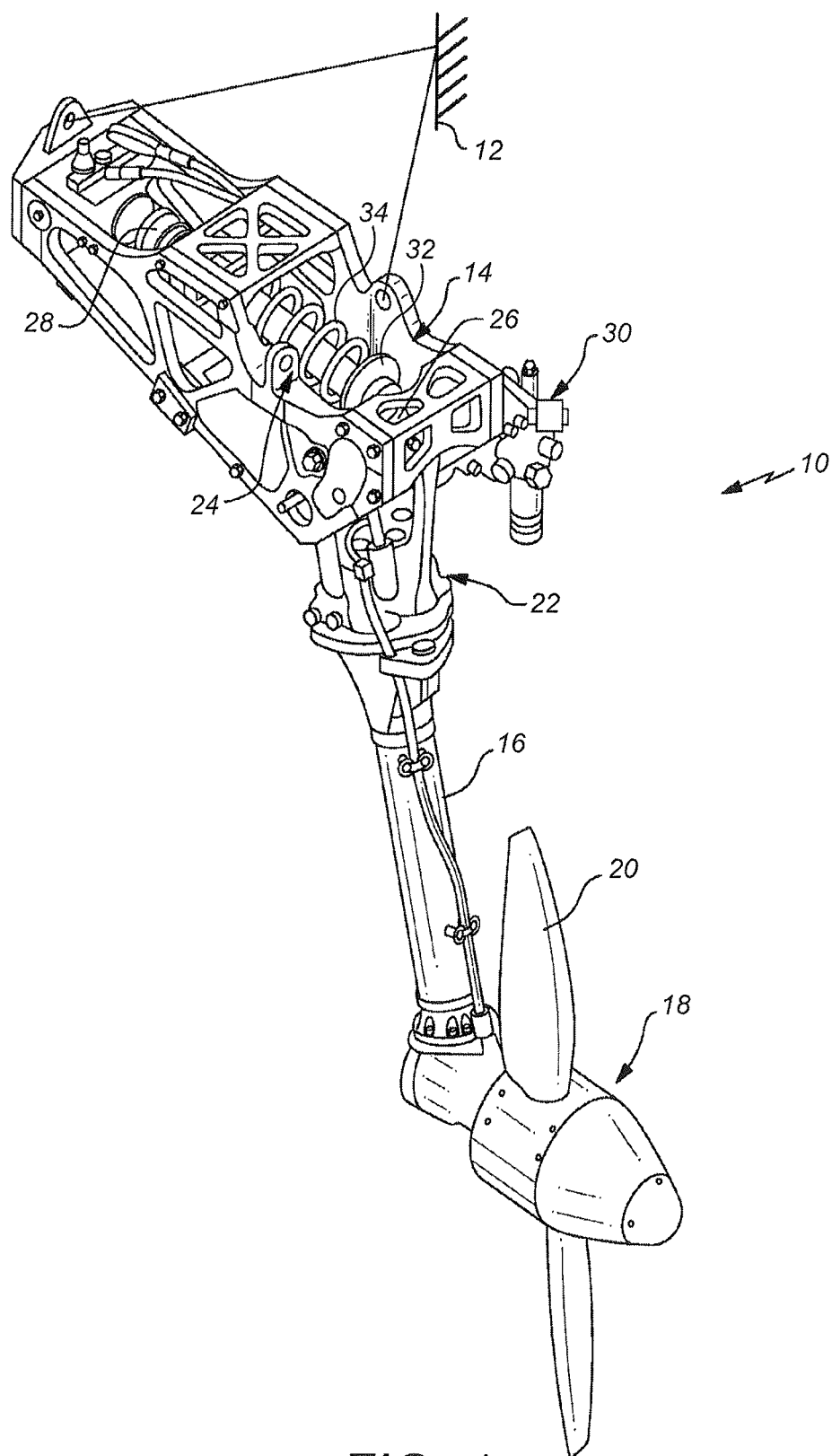
FIG. 1 illustrates a ram air turbine (RAT)

FIG. 1 illustrates an RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is bias by a spring 34 in order to deploy the strut 16. When the cylinder 32 is retracted, it is held in its retracted position by means of a locking mechanism 36, details of which will be described with reference to FIGS. 2 to 6.

Figure 2:
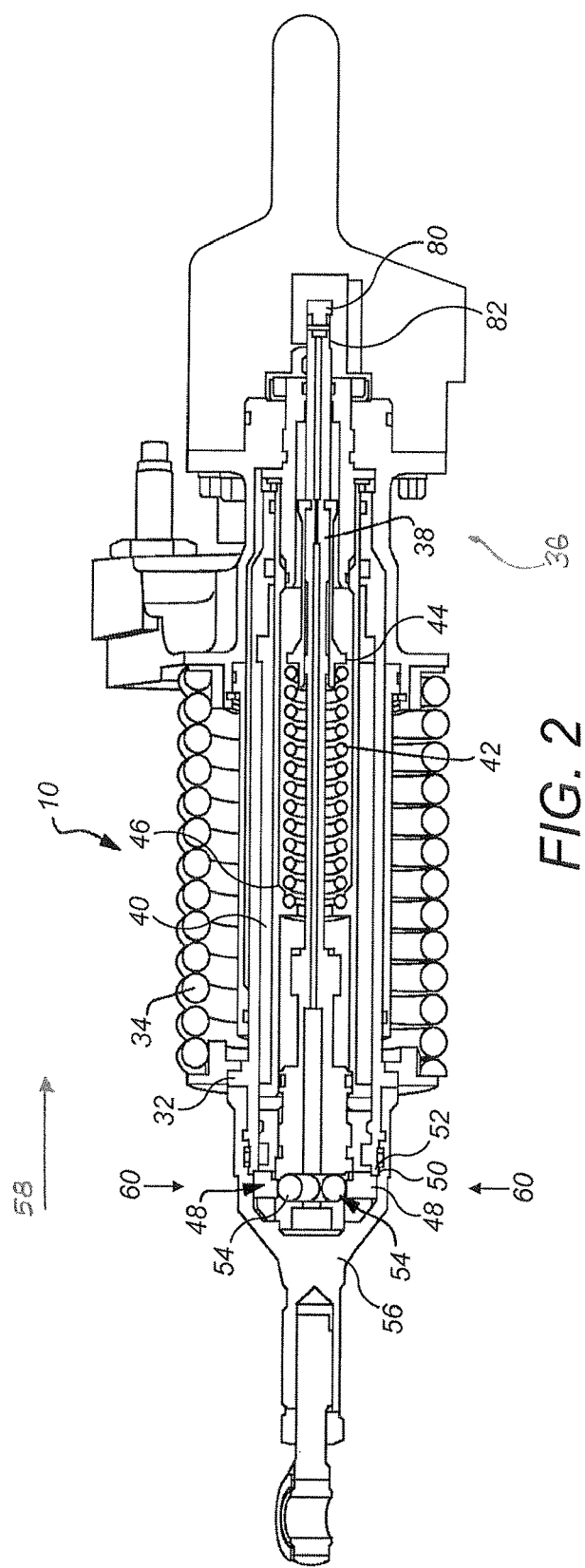
FIG. 2 illustrates a partial view of a locking mechanism for a RAT actuator.

With reference to FIG. 2, the locking mechanism comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the left in a direction of arrow 58, the wedges 48 may displace in the direction of arrows 60 thereby disengaging the shoulders 50, 52 and allowing the cylinder 32 to extend to deploy the RAT.

This unlocking movement of the locking piston 38 is made possible by means of an apparatus 60 which will be described with reference to FIGS. 3 to 6.

The apparatus 60 comprises a first member 62 and a second member 64. The first member 62 is rotatably mounted for rotation about an axis A in a housing 66. The housing 66 will be fixed in a suitable manner to the housing of the actuator 14. It should be noted that the term "member" as used herein is not limited to unitary elements, and embraces both unitary elements and assemblies.

The apparatus 60 further comprises a pair of rotary actuators 68 also mounted in the housing 66 and which are rotatably coupled with the first member 62 in order to be able to rotate the first member 62 between first and second rotational positions as will be described further below.

Figures 7A, 7B:
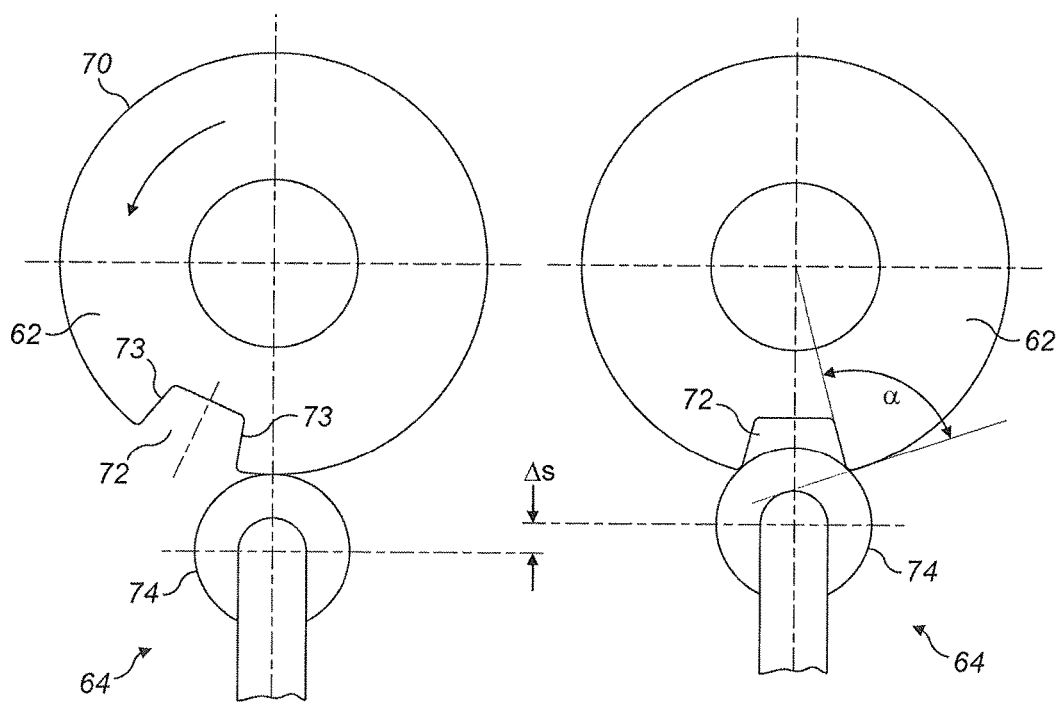
FIGS. 7B and 7B illustrate a schematic cross sectional view of the locking mechanism in locked and unlocked configuration respectively.

The first member 62 is a generally cylindrical member having a circumferentially extending surface 70. As can be seen most clearly in FIGS. 3, 5, 7A and 7B, a recess 72 is formed in the circumferential surface 70. As can best be seen from FIGS. 7A and 7B, the recess 72 is formed such that there is a relatively abrupt, rather than gradual, transition between the circumferential surface 70 and the side walls 73 of the recess 72. As an example, the angle a between the foremost recess side wall 73 and the tangent to the circumferential surface 70 may be between 120° and 60°, for example between 105° and 75°, for example about 80°.

The second member 64 comprises a follower element 74 in the form of a roller. The follower element 74 need not be a roller, but a roller may be advantageous in that it reduces frictional forces between the first and second members 62, 64. The roller 74 is rotatably supported on a shaft 76 supported by a yoke 78. A mounting pin or rod 80 extends from the yoke and, as shown in FIG. 2, is mounted at the proximal end 82 of the locking piston 38. The follower 74 will therefore be biased into contact with the circumferential surface 70 of the first member 62 by virtue of the biasing spring 42 of the locking mechanism 36.

Returning now to FIGS. 3 to 7B, the first member 62 is rotatably supported at opposed ends 84, 86 in a pair of mounting rings 88. A sliding bearing 90 is provided between the mounting rings 88 and the ends 84, 86 of the first member 62. The sliding bearing 90 may, for example, be formed by the respective materials of the first member 72 and the mounting rings 88. Alternatively, a low friction insert may be provided to provide a bearing surface. In yet further embodiments, a rolling bearing may be provided.

The mounting rings 88 also mount the rotary actuators 68. In this regard, a portion 92 of the mounting rings 88 may be provided with, for example, screw threads which engage with screw threads formed on an opposed mounting surface 94 of the rotary actuator 68. Other forms of attachment of the rotary actuators 68 to the mounting rings 88 may however be used.

The mounting rings 88 are received in opposed bores 96 provided in an annular wall portion 98 of the housing 66. In one embodiment, a push fit connection 100 may be formed between the mounting rings 88 and the bores 96 to retain the mounting rings 88 in the bores 96. Other arrangements can however be used.

Figure 5:
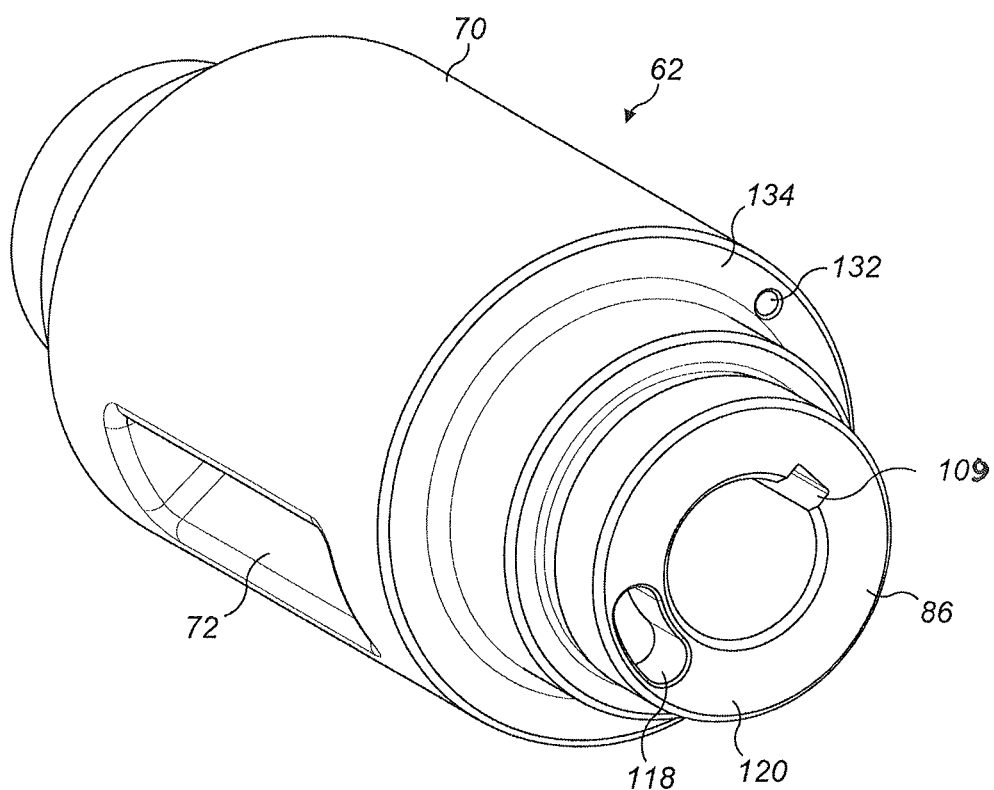
FIG. 5 shows a perspective view of one component of the locking mechanism shown in FIGS. 3 and 4.
Figure 6:
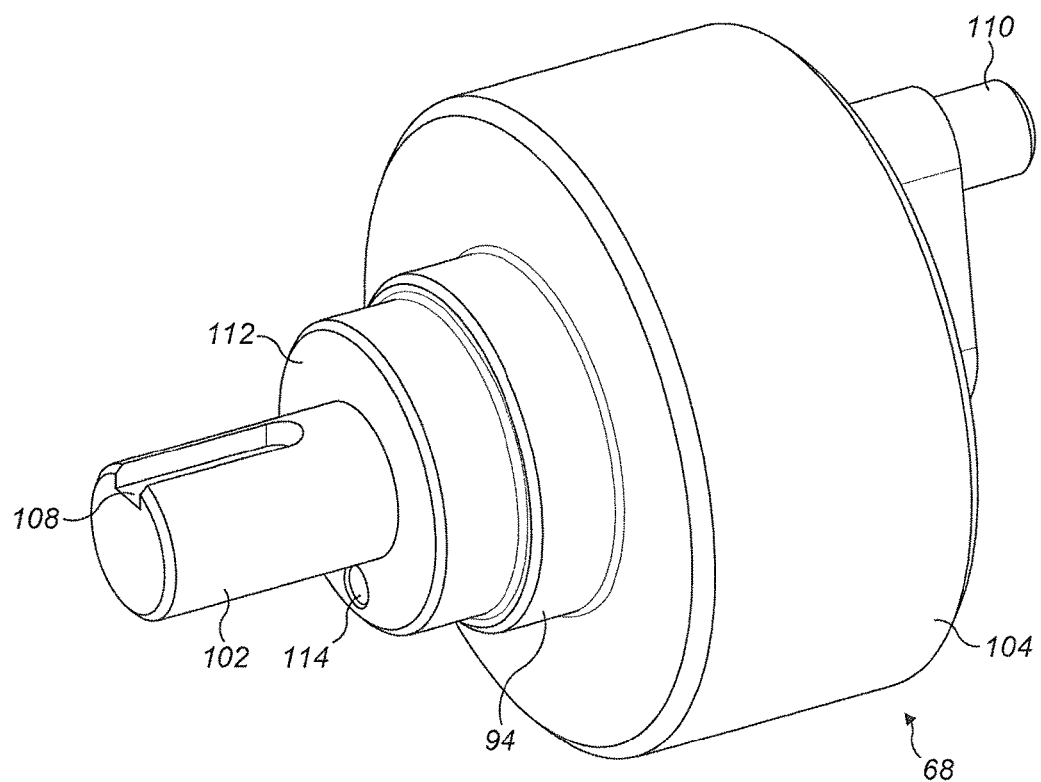
FIG. 6 shows a perspective view of a second component of the locking mechanism shown in FIGS. 3 and 4.

As illustrated, the actuators 68 are rotary solenoids. Rotary solenoids are well known in the art and the actuator 68 does not, therefore, need to be described in great detail. Briefly, however, a rotary solenoid will produce a rotary movement when activated. Each actuator 68 comprises a shaft 102 which is rotatably received within an actuator body 104. A key 106 is received in a keyway 108 provided on one end of the shaft 102. The key 106 is received in a corresponding slot 110 formed the respective ends 84, 86 of the first member 70, as best seen in FIG. 5.

The other end of the shaft 102 is attached to a handle 110 which will allow manual rotation of the shaft 102 in the event that the electrical power supply to the coils 111 of the actuator 68 fails.

A forward face 112 of the rotary actuator 68 is provided with a bore 114 which receives one end of a pin 116. As can best be seen in FIGS. 4 and 5, the other end of the pin 116 is received in an arcuate slot 118 in the end surface 120 of the first member 70. The pin 116 therefore acts as a stop pin, limiting the rotational movement of the first member 70 about the axis A to the circumferential extent of the slot 118.

Figure 3:
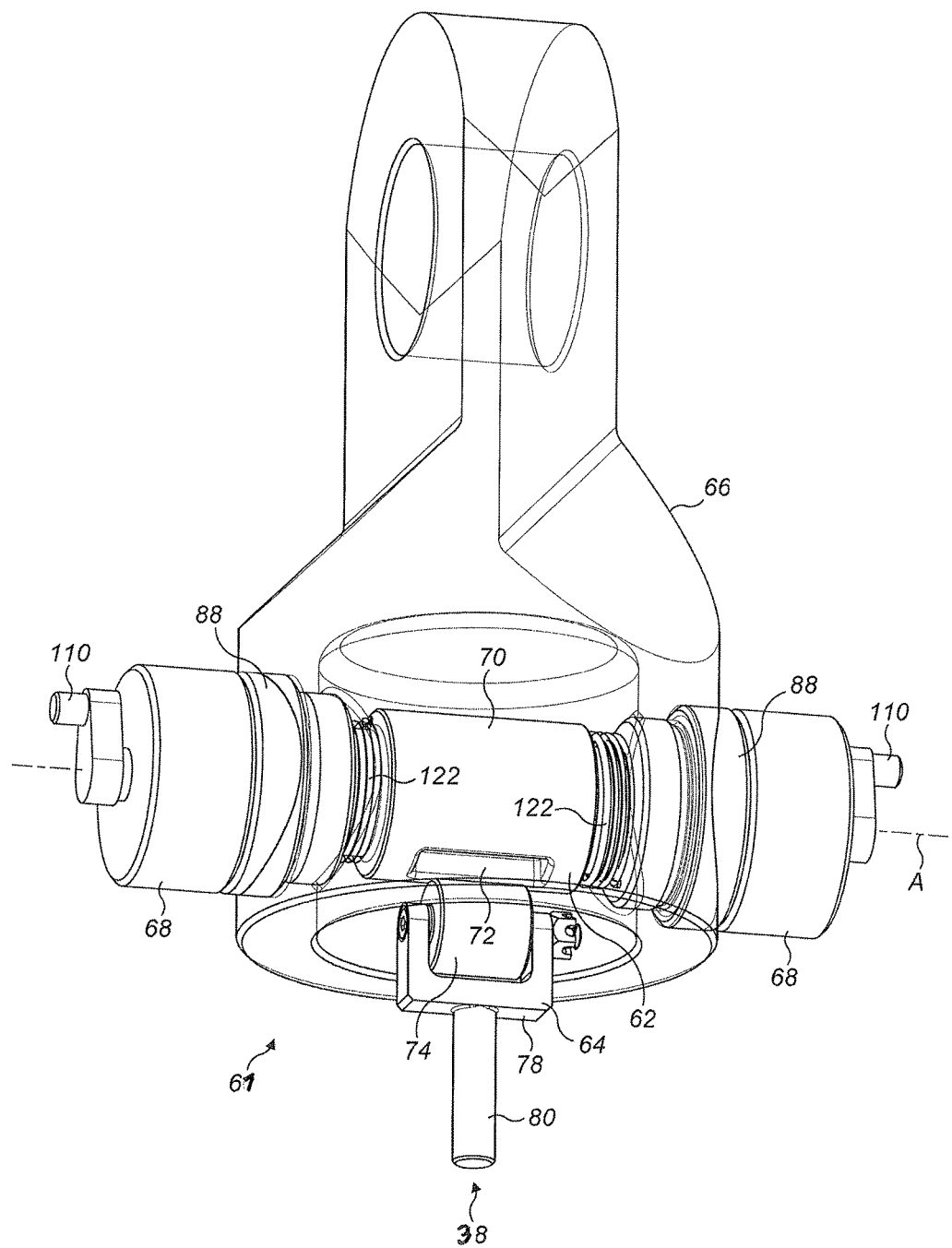
FIG. 3 shows a part phantom perspective view of a further part of the locking mechanism.
Figure 4:
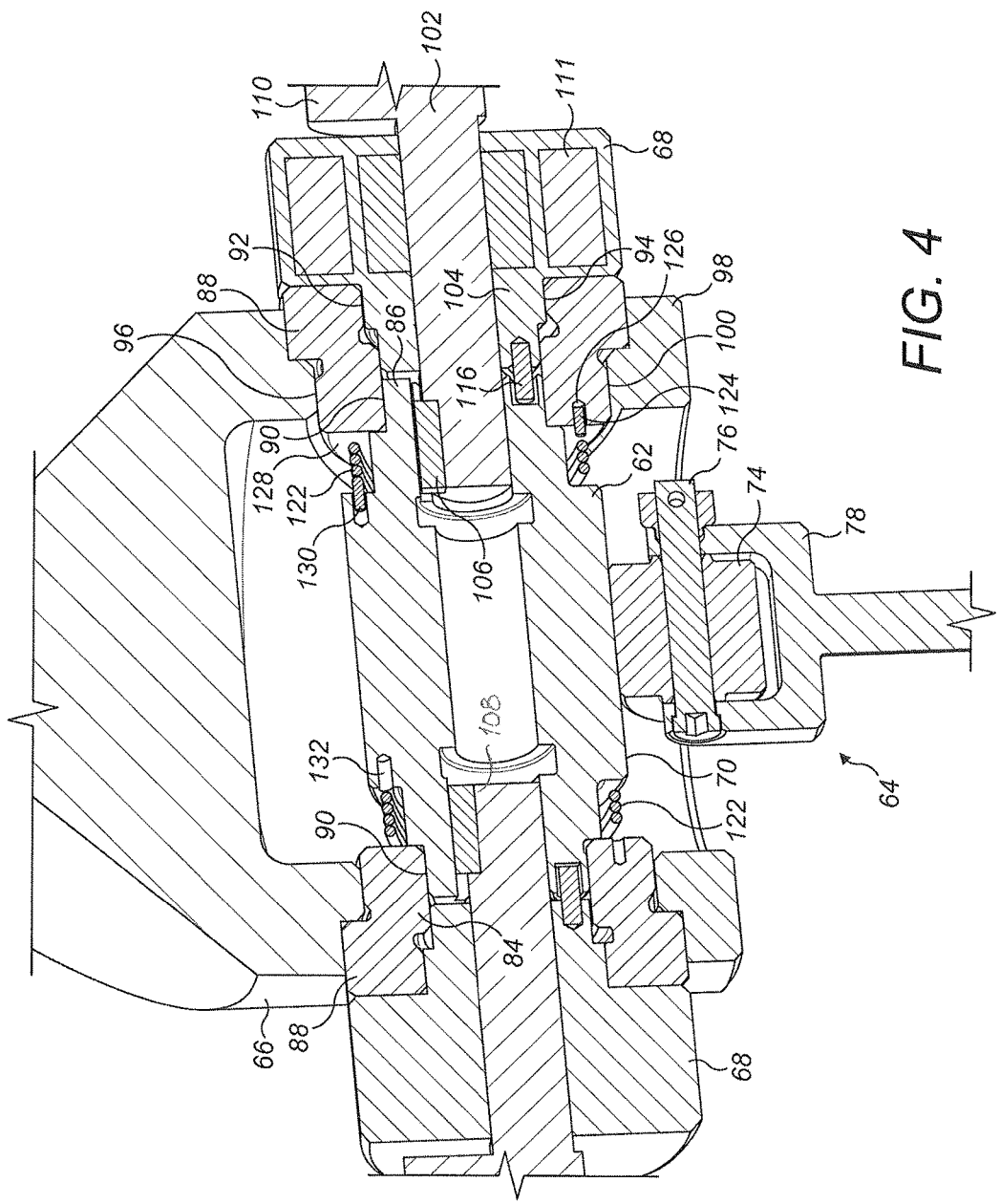
FIG. 4 shows a cross sectional view of the mechanism of FIG. 3.

As can best be seen in FIGS. 3 and 4, respective biasing springs 122 are arranged between the respective mounting rings 88 and the first member 70. In this embodiment the biasing springs 122 are torsion springs, although other springs may be used if appropriate. As can be seen in FIG. 4, a tang 124 formed at one end of the spring 122 is received in a bore 126 provided in an end face 128 of the mounting ring 88. A second tang 130, at the other end of the spring 122, is received in a bore 132 formed in an axially facing surface 134 of the first member 70. The torsion springs 122 bias the first member 70 to a position such that a portion of the circumferential surface 70 opposes the roller 74 of the second member 64.

Operation of the unlocking apparatus will now be described.

FIGS. 2, 3, 4 and 7A show the apparatus in a locked position. In this position, the roller 74 of the second member 64 is resiliently biased against the circumferential surface 70 of the first member 62 by means of the biasing spring 42.

When it is desired to unlock the actuator 14 to allow deployment of the strut 16, power is supplied to the rotary actuators 68 so as to rotate the first member 70 in a direction which brings the recess 72 in the circumferential surface 70 into alignment with the roller element 74 of the second member 64. This movement takes place against the biasing force of the torsion springs 122. Movement of the first rotary member 62 beyond this position is prevented by the stop pins 116.

In this position, the second member 64 is able to move upwardly (in the sense of FIG. 3) in the direction of arrow 58 so as to move the roller element 74 into the recess 72. As can be seen from FIG. 7B, the roller element 74 does not bottom out in the recess 72 but engages the upper edges of the recess side walls 73. Since the transition between the recess wall 73 and the circumferential surface is relatively abrupt, the roller element 74 will move into the recess 72 rapidly, allowing a rapid, rather than gradual, unlocking movement.

This movement is sufficient to move the rollers 56 of the locking piston 38 out of alignment with the locking surfaces of the locking wedges 48, thereby allowing deployment of the actuator cylinder 32. It will be understood that compared to the prior art system discussed in the introduction, the only forces which need to be overcome in order to effect this unlocking are the biasing forces of the torsion springs 122 and any frictional forces between the first and second members 62, 64. However, the use of a roller element 74 minimises frictional forces. In this way, the rotary actuator 68 may be made relatively small.

In the event that a power supply to the rotary actuator fails, an operator may still effect the unlocking by manually rotating the handles 110, as this will rotate the first member 70.

When the RAT is to be retracted, the lock piston 38 is moved in the opposite direction by suitable means so as to move the second member 64 away from the first member 62. Once the roller element 74 disengages from the recess 72 in the circumferential surface 70, the torsion springs 122 will return the first member 62 to the "locking" position in which the recess 72 is placed out of alignment with the roller element 74. This position is determined by the stop pin 116.

The above is a description of just a single exemplary embodiment. Modifications may be made to that embodiment without departing from the scope of this disclosure.

For example, whilst in this embodiment two actuators 68 are shown, the system would work with just one such actuator. Also, alternative forms of mounting the rotary actuator 68 and first member 70 may be envisaged which do not use mounting rings as disclosed.

Also, as discussed above, another type of engagement between the first and second members 62, 64 may be used. In other embodiments, for example, the roller element 74 may be replaced by a low friction element which will slide, rather than roll, on the circumferential surface 70 of the first member 62.

Also, while the apparatus has been described in the context of unlocking a RAT actuator, it may find use in other applications, for example in applications where a relatively large actuator biasing force may have to be overcome to effect unlocking. As discussed above, the only forces which need to be overcome in the present apparatus are those of the torsion springs and friction.

The invention claimed is:

1. An apparatus for unlocking an actuator, the apparatus comprising:
   a first member mounted in a housing for rotation about an axis and having a circumferentially extending surface, a recess being formed in a section of the circumferentially extending surface;
   a second member for operative connection to a lock release element of an actuator for movement in a direction generally transverse to the axis of rotation of the first member and having a follower element resiliently biased into contact with the circumferentially extending surface of the first member; and
   a rotary actuator for rotating the first member about the axis between a first, locking position in which the follower element engages on the circumferentially extending surface and a second, unlocking position in which the follower element is at least partially received within the recess.

2. An apparatus as claimed in claim 1, wherein the first member is generally cylindrical in shape having a generally circular cross section.

3. An apparatus as claimed in claim 1, wherein the first member is spring biased into its first position by one or more springs, for example by torsion springs arranged around the axis of rotation of the first member.

4. An apparatus as claimed in claim 1, further comprising one or more stops to limit the movement of the first member between its first and second positions.

5. An apparatus as claimed in claim 4, wherein the first member comprises an arcuate slot on one or more end surfaces for engagement with a respective stop pin mounted in the housing.

6. An apparatus as claimed in claim 1, wherein the rotary actuator is a rotary solenoid.

7. An apparatus as claimed in claim 1, comprising a pair of rotary actuators arranged at opposed ends of the first member.

8. An apparatus as claimed in claim 1, wherein the rotary actuator comprises a handle for manipulation by a user.

9. An apparatus as claimed in claim 1, wherein the first locking member and the rotary actuator are mounted to a mounting ring received within a bore of the housing.

10. An apparatus as claimed in claim 1, wherein the follower element is a roller.

11. An actuator comprising an unlocking apparatus as claimed in claim 1.

12. An actuator as claimed in claim 11, further comprising a locking rod axially movable between a locking an unlocking position, and wherein the second member of the locking apparatus is coupled to an end of the locking rod such that movement of the follower element of the second member into the recess of the first member moves the locking rod to an unlocking position.

13. An actuator as claimed in claim 12, further comprising a spring for biasing the locking rod towards the first member, that spring the spring biasing for the second member.

14. An actuator as claimed in claim 11, wherein the actuator is a RAT actuator.

15. An actuator as claimed in claim 12, wherein the actuator is a RAT actuator.

16. An actuator as claimed in claim 13, wherein the actuator is a RAT actuator.

17. A method of unlocking an actuator comprising rotating a first member having a circumferentially extending surface about an axis from a first position in which a follower element of a second member coupled to the actuator and biased into engagement with the first member engages the circumferentially extending surface of the first member and a second position in which the follower element is at least partially received within a recess in the surface to produce an unlocking movement for the actuator.

\* \* \* \* \*